(No Model.)
E. L. PARSONS.
Gear Wheel Cutter.
No. 241,879. Patented May 24, 1881.
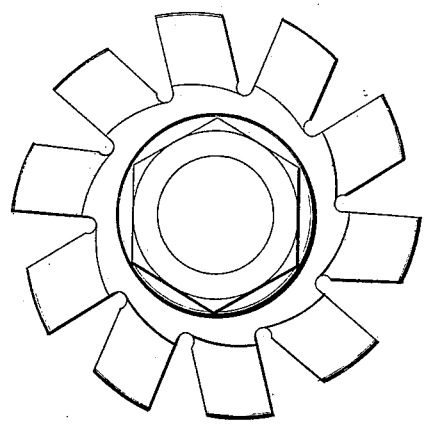
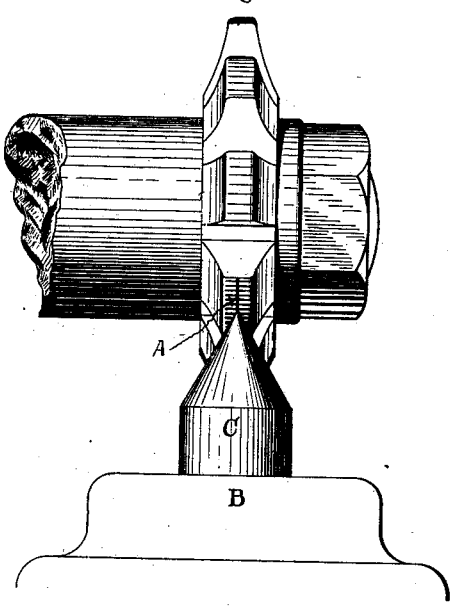
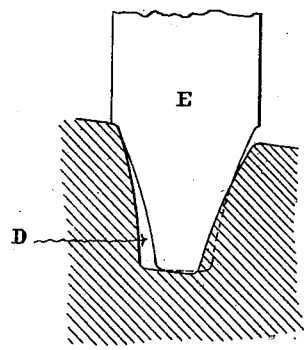
Witnesses
George H. Smith
John C. Hall
Inventor
Edwin L. Parsons

UNITED STATES PATENT OFFICE.

EDWIN L. PARSONS, OF PROVIDENCE, RHODE ISLAND, ASSIGNOR TO THE BROWN & SHARPE MANUFACTURING COMPANY, OF SAME PLACE.

GEAR-WHEEL CUTTER.

SPECIFICATION forming part of Letters Patent No. 241,879, dated May 24, 1881.

Application filed March 23, 1881. (No model.)

*To all whom it may concern:*

Be it known that I, EDWIN L. PARSONS, of Providence, Rhode Island, have invented a new and useful Improvement in Gear-Wheel Cutters, of which the following is a specification.

The object of my invention is to set the cutter in the gear-cutting machine central with the spindle upon which the blank is held; and it consists in making a small line about two one-thousandths of an inch in width, (0.002,) more or less, in the center of the peripherical contour of one or more teeth of the cutter, transverse with its axis; or a conical or some other form of groove or mark may be used instead of a small line.

Heretofore the eye has been the principal guide in seating gear-wheel cutters. The points of the cutter-teeth being rounding, the center cannot be found with a graduated rule or dividers, and it would be too difficult and expensive, if practicable, to make an instrument to fit and accompany each size cutter to be used as a guide in setting it. It is well known that there is a great difference in the natural faculty of mechanics for doing such work by the eye. Some can work quite accurately, while others cannot depend upon their eye for anything accurate.

I was led to make this improvement by having cut a gear-wheel with the cutter set so far out of the center that the foreman of the works noticed the defect in passing by the machine in which the work was being done.

With my improvement any mechanic can set a cutter with the greatest accuracy; and when it is taken into consideration what a vast number of cutters are being set and used every day, with that number rapidly increasing, it is clear that my improvement is a useful and important one, and an essential element in the cutter.

In the accompanying drawings, Figure 1 is a side elevation of a gear-wheel cutter to which I apply my improvement; Fig. 2, a front elevation of the same and spindle of a gear-cutting machine having a sharp center. Fig. 3 represents part of a gear-wheel cutter, a space having been cut in the blank before the cutter was "got central."

The letter A represents a small line in the center of the peripherical contour of one tooth of the cutter; B, the upper part of the spindle of a gear-wheel-cutting machine; C, a sharp center in spindle B; D, space in the blank cut before the cutter was got central; E, tooth of a gear-wheel cutter.

There are several ways of setting gear-wheel cutters central; but all are attended with expense and inaccuracy. One mode is to set the cutter as central as possible by the eye, cut a space, (less than the full depth, so as not to spoil the blank,) and then turn the blank upside down, and if the cutter fits the space when so reversed the cutter is set right. If the cutter does not fit, it is to be adjusted and another space cut, the blank reversed again, and so on until the cutter is got central. I do not know of any method that can be depended upon without reversing the blank as above described.

To set my improved cutter, a sharp center, C, having been put in the spindle B, the cutter-head, which is mounted on ways, is run toward the spindle until the central line on the cutter comes sufficiently near the sharp point of the center, where it can be immediately set with great accuracy.

The periphery of the cutter-teeth shown in the drawings is eccentric with the axis of the cutter, and the same machinery will be required to make the small central line, A, that is used in manufacturing the cutters. The line runs the whole length of the tooth, and will remain as long as the cutter lasts.

Having fully described my invention, what I claim as new, and desire to secure by Letters Patent, is—

A gear-wheel cutter having a line in the center of the peripherical contour of one or more of its teeth as a guide in setting the cutter central in the gear-cutting machine, substantially as described.

EDWIN L. PARSONS.

Witnesses:
 JOHN E. HALL,
 SAML. DARLING.